May 27, 1952  E. L. BUTLER ET AL  2,597,972
APPARATUS FOR USE IN SCRIBING WIPER BLANKS
Filed Dec. 6, 1949  2 SHEETS—SHEET 1

Inventors
Ernest L. Butler
Otis M. Holmes,
By their Attorney

May 27, 1952  E. L. BUTLER ET AL  2,597,972
APPARATUS FOR USE IN SCRIBING WIPER BLANKS
Filed Dec. 6, 1949  2 SHEETS—SHEET 2

Inventors
Ernest L. Butler
Otis M. Holmes
By their Attorney

Patented May 27, 1952

2,597,972

UNITED STATES PATENT OFFICE 2,597,972

APPARATUS FOR USE IN SCRIBING
WIPER BLANKS

Ernest L. Butler, Lynn, and Otis M. Holmes, Beverly, Mass., assignors to United Shoe Machinery Corporation, Flemington, N. J., a corporation of New Jersey Application December 6, 1949, Serial No. 131,468

3 Claims. (Cl. 33—180)

This invention relates to apparatus for use in scribing upon blanks for operating instrumentalities, such for example as wiper blanks, marks delineating their working edges, and is herein illustrated in its application to apparatus for locating the heel wiper blanks and the side wiper blanks of a stitchdown lasting machine relatively to each other and relatively to a template employed in the scribing operation. It will be understood however that the invention is not limited to its illustrated embodiment in apparatus for use in scribing the wiper blanks of a stitchdown lasting machine but is equally applicable to apparatus employed in scribing other types of wiper blanks or blanks for operating instrumentalities other than wipers.

In lasting stitchdown uppers by means of lasting wipers the wipers advance to a predetermined position in which position they are impressed into the grain face of the upper to form a crease at the root of the outturned flange of the upper. In order that the crease may be continuous and unbroken and uniformly spaced relatively to the edge of the last bottom throughout its entire length it is of the utmost importance that the wiping edges of the lasting wipers be accurately delineated so that they will come to rest at the limit of their wiping movement in precisely predetermined relation to the last bottom. It is also desirable that the wipers come to rest at the limit of their wiping movement with their wiping edges in accurate alinement to each other in order that they may form in the upper one continuous crease defining the root of the outturned flange.

It is an object of the present invention to provide apparatus which will facilitate the operation of scribing upon blanks for operating instrumentalities, such as wipers, marks accurately delineating their wiping edges. With this object in view the invention in one aspect thereof comprises apparatus which consists of a base plate for supporting a blank for an operating instrumentality, such for example as a wiper in a position determined by the registration of a pin with a bore in said plate and in an orientation determined by an abutment mounted on the base plate and arranged to engage a finished edge of the wiper blank. The position of a template relatively to a wiper blank is determined by an index mark on an extension of a plate underlying the template which registers with a reference mark on the template and a gage member for determining the position of the template in one direction relatively to the wiper blank. The illustrated gage member has inscribed thereon an index mark intended to register with the reference mark on the template. The illustrated gage member is mounted on a block fixed to the base plate for adjustive movement between predetermined gaging positions. The illustrated apparatus includes a base plate which is bored to receive pins locating heel wiper blanks and is also bored to receive pins locating side wiper blanks and has mounted thereon abutment members which orient the wiper blanks relatively to each other and relatively to a template.

The invention will now be described with relation to the accompanying drawings illustrating a preferred embodiment thereof and will be pointed out in the appended claims.

The illustrated apparatus serves to mount a pair of heel wiper blanks and a pair of side wiper blanks which are to be shaped for operation in a machine for lasting stitch-down shoes. The illustrated apparatus locates the wiper blanks relatively to each other in the respective positions which they will occupy in the lasting machine at the completion of their wiping movement. The illustrated apparatus is also provided with means for locating a shoe bottom template relatively to the wiper blanks in a position corresponding to the position of a shoe in the lasting machine. In this position the edge of the template will define precisely the position of the wiping edge of the respective wipers when the wipers are at the limit of their wiping movement. Thus it will be seen that when the wiper blanks and the shoe bottom template are located relatively to each other in the position determined by the illustrated apparatus a mark scribed on each wiper blank following the edge of the template will serve to indicate accurately thereon the line along which the blank is to be cut to shape its wiping edge. For reasons hereinafter explained the template used in marking the heel wiper blanks is slightly different in shape from the template used in marking the side wiper blanks and consequently the marking of the heel wipers and the side wipers in accordance with the present invention constitutes two separate operations.

Figure 1:
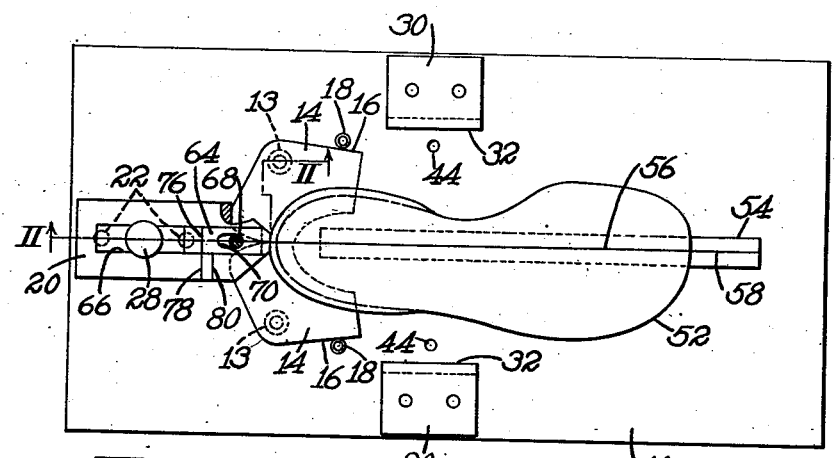
Fig. 1 is a plan view illustrating apparatus embodying the features of the present invention.
Figure 2:
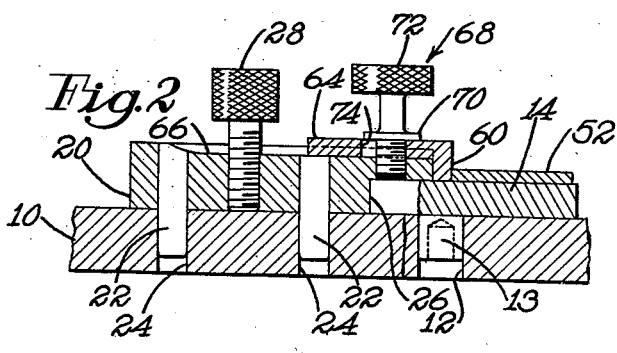
Fig. 2 is a section taken on the line II—II of Fig. 1.

Referring to Fig. 1 the illustrated apparatus comprises a base plate 10 which may be mounted on a bench conveniently located with relation to the machine in which wiper blanks will be shaped. At opposite sides of the longitudinal center line of the plate 10 and equally distant therefrom are two bores 12 which receive the fulcrum pins 13 (Fig. 2) of heel wiper blanks 14 (Fig. 1). The outer edges of the illustrated heel wiper blanks have received their final shape and all that remains to be done to complete the wipers is to shape their wiping edges. In the illustrated apparatus each heel wiper blank is located on the base plate 10 by inserting its pivot pin 13 into the appropriate bore 12 in the base plate and swinging the wiper on its pivot pin into an angular position determined by the engagement of the finished side edge 16 of the wiper blank with a pin 18 mounted in the base plate. Two such pins are provided and are located at opposite sides of the longitudinal center line of the base plate and equally distant therefrom and from the bores 12 formed in the base plate. When the heel wiper blanks are mounted on the base plate and brought into engagement with the pins 18 they are located in a relative angular position corresponding to the relative position which they will occupy in a lasting machine. The wiper blanks are held in position against angular movement by a block 20 constructed and arranged to engage adjacent end portions of the wiper blanks. The block 20 is located in predetermined relation to the heel wiper blanks by dowel pins 22 (Fig. 2) projecting downwardly therefrom and arranged to be inserted into two bores 24 formed in the base plate. The block 20 is provided with an undercut end face or shoulder 26 which is accurately located for engagement with the wiper blanks by inserting the dowels 22 into the bores 24, as shown in Fig. 2. To facilitate the removal of the block 20 from the base plate a knurled headed screw 28 is mounted in a tapped hole in the block 20. The screw 28 is of such a length that its head is spaced substantially above the top surface of the block. The screw 28 may serve as a knob to facilitate lifting the block from the base plate or the operator may turn the screw to bring its end face to bear against the top of the base plate and force the block away from the base plate in the event the dowel pins 22 become stuck in the base plate. In order to cause the lifting action of the screw to be uniformly applied to the dowel pins it is equally spaced therefrom as shown in Fig. 2.

Figure 3:
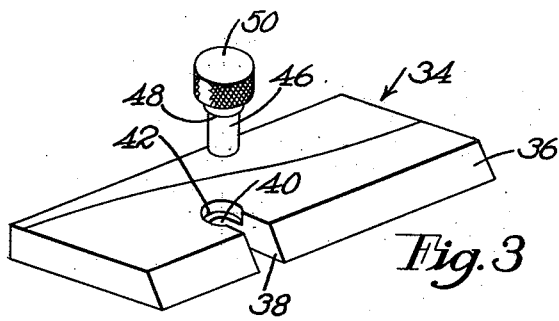
Fig. 3 is an enlarged perspective view illustrating a blank from which a side wiper is to be made and a pin for locating the blank on a base plate, said blank having scribed thereon a line indicating the wiping edge to be formed therein.

For locating the side wiper blanks in accurately predetermined position on the base plate said plate has permanently secured thereto and equally spaced from the longitudinal center line thereof two abutment members herein illustrated as locating plates 30. Each of these plates has an undercut beveled edge face 32 against which is positioned the complementally beveled edge face of a side wiper blank such, for example, as the blank 34 illustrated in Fig. 3. The side wiper blanks, like the heel wiper blanks, are in their final form except for their wiping edges and consequently the blanks may be accurately located widthwise thereof on the base plate by bringing their beveled edge faces 36 into engagement with the beveled edge faces 32 of the plates 30. In accordance with the usual practice each side wiper plate has formed therein an open ended slot 38 (Fig. 3) said slot having its opening in the beveled edge face of the blank. At its inner end the slot 38 terminates in a bore 40 and concentric with said bore is a counterbore 42. The slot, bore and counterbore in each side wiper are precisely located in predetermined position lengthwise and widthwise of the wiper blank and the distance between the center of the bore and the heel end of the wiper is constant for all sizes and shapes of wipers. In the lasting machine the wiper is accurately located in predetermined relation to the wiper carrier by bringing the bore 40 into registration with a bore in the wiper carrier and inserting fastening means to secure the wiper to the carrier. In the same manner the wiper is located in predetermined position lengthwise thereof on the base plate 10 by bringing the bore 40 into registration with a bore 44 in the base plate and then securing the wiper blank in such predetermined position by inserting a pin 46 (Fig. 3) through the bore 40 and into the bore 44 in the base plate. The side wiper blank is held against widthwise movement on the base plate by the insertion of an enlarged portion 48 of the pin 46 into the counterbore 42. The pin 46 is provided with a head 50 to permit convenient manipulation thereof.

After mounting the wiper blanks on the base plate 10 in the manner above described a template such, for example, as the template 52, illustrated in Fig. 1, is placed upon the top surfaces of the wiper blanks and upon a long, narrow plate 54 of the same thickness as the wiper blanks and fixed to the base plate in a central position widthwise thereof. In order to provide a reference mark the template has scribed thereon a tread center line 56, that is, a straight line extending from the center of the toe end of the template to the center of its heel end. In order to provide an index mark for registration with the reference mark on the template the plate 54 has scribed thereon a center line 58. The toe portion of the template 52 is positioned widthwise thereof by causing the tread center line 56 to register accurately with the center line 58 of the plate 54, as shown in Fig. 1. The heel end portion of the template is positioned widthwise thereof by causing the heel end portion of the tread center line to register accurately with a mark (not shown) on the exposed vertical surface of an angular gage plate 60, said mark being located centrally widthwise of the gage plate. The template is positioned lengthwise thereof by bringing the edge of its heel portion into abutting relation to the vertical face of the gage plate as shown in Fig. 1. The template is manually held in a position relatively to the wiper blanks determined as above described while a suitable scribing tool is employed to make a mark on the upper surface of each wiper blank following the edge of the template. In order that the mark thus formed by the scribing tool may be readily visible the wiper blank will preferably have been thinly coated with an adhering substance such as lacquer which is cut through by the point of the scribing tool to leave a well defined mark on the wiper blank.

In marking the heel wipers 14 a template such as the template 52 illustrated in Fig. 1 is employed. The forepart and shank portion of this template are the same size and shape as the corresponding portions of the last maker's last bottom pattern for the last used in shaping the shoe to be operated upon. The shape of the heel portion of the template 52 is determined by adding to the heel portion of the last maker's last bottom pattern a uniform extension the width of which corresponds to the thickness of the heel stiffener or counter in the rear portion of the shoe.

Figure 4:
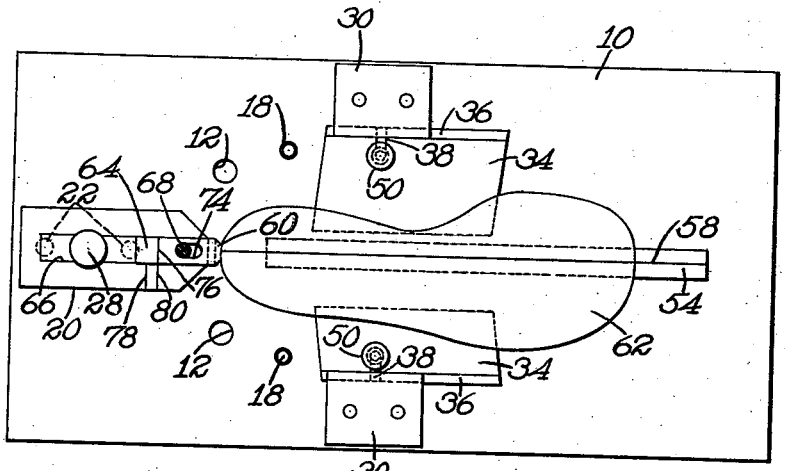
Fig. 4 is a plan view similar to Fig. 1 showing a pair of side wipers mounted on the illustrated apparatus.
Figure 5:
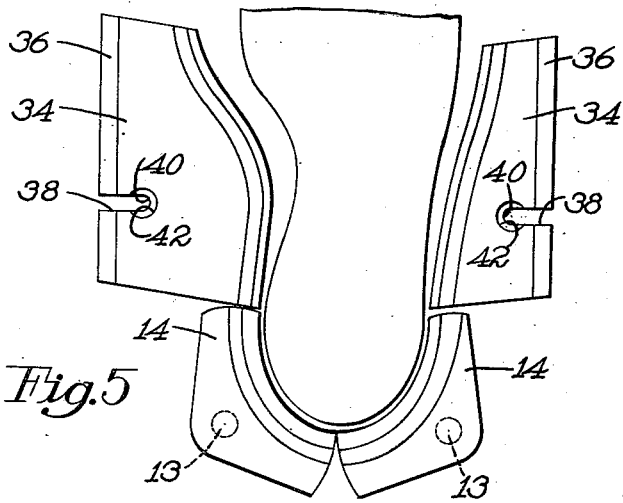
Fig. 5 illustrates a heel and side wiper assembly in relation to the rear part of an insole.

For marking the side wipers there is employed a template such, for example, as the template 62 illustrated in Fig. 4 which is a duplicate of the last maker's last bottom pattern. The mark formed on the side wiper may or may not be followed exactly in shaping the wiping edge. In some cases the specifications of the shoe manufacturer ordering the wipers call for the formation of the rear part of the wiping edge of the side wiper in tangent relation to the line of the wiping edge of the heel wiper. In such cases the operator, using the mark on the wiper blank as a guide, determines by eye the line of the rear part of the wiping edge. It will be understood that this line could be incorporated in the template 62 if desired. However, inasmuch as it would probably be impossible to determine a line for the rear part of the side wiper which would be acceptable as standard by all shoe manufacturers it appears to be desirable to take the last maker's last bottom pattern as the standard and to rely upon the operator to determine the shape of the rear part of the wiping edge in those cases where it varies from the line of the last bottom pattern.

When it is desired to change from the marking of heel wipers to the marking of side wipers it is necessary to adjust the gage plate 60 toewardly, or to the right as seen in Fig. 1, to the extent of the width of the marginal extension around the heel portion of the template 52 in order that the position of the shank portion of the template 62 lengthwise thereof on the plate 54 will correspond exactly to the position of the shank portion of the template 52 when said template is mounted on the plate 54. Such adjustment of the gage plate is required to insure a correct relation between the wiping edges of the heel wipers and the wiping edges of the side wipers when the wipers are mounted in a lasting machine. In order to provide for such adjustment of the gage plate 60 its shank portion 64 is slidably mounted for adjustive movement in a longitudinal groove 66 formed in the upper surface of the block 20 and a clamping screw 68 is provided for securing the gage plate in adjusted position. The clamping screw has a flange 70 which is brought to bear against the upper surface of the shank portion 64 of the gage plate by manipulation of a knurled head 72 which is conveniently located above said shank portion. The clamping screw extends through a longitudinal slot 74 in the shank portion 64 and into a tapped hole in the undercut end portion of the block 20. The position of the gage plate 60 for locating the template 52 is determined by bringing an index mark 76 into registration with a mark 78 on the upper surface of the block 20. Similarly the gage plate 60 is positioned for locating the template 62 by causing the index mark 76 to register with a mark 80 formed on the block 20.

Inasmuch as the setting of the gage plate must be adjusted when changing from the marking of heel wipers to the marking of side wipers it has been found desirable to make the marking of heel wipers an operation distinct and separate from the marking of side wipers. Consequently when heel wipers are to be marked heel wipers only will be mounted on the base plate, as shown in Fig. 1, and similarly when side wipers are to be marked side wipers only will be mounted on the base plate, as shown in Fig. 4.

Having thus described our invention, what we claim as new and desire to secure by Letters Patent of the United States is:

1. Apparatus comprising a base plate for supporting a blank, a pin insertable into a bore in the base plate to locate any one of a plurality of blanks on the base plate, an abutment for determining the orientation of a blank on the base plate, and means for determining the position of any one of a plurality of templates relatively to a blank on the base plate comprising a plate underlying and extending beyond a template positioned thereon, said plate having inscribed thereon an index mark intended to register with a reference mark on a template positioned thereon, and a gage member for determining the position of a template in one direction relatively to a blank on the base plate.

2. Apparatus comprising a base plate for supporting a blank, a pin insertable into a bore in the base plate to locate any one of a plurality of blanks on the base plate, an abutment for determining the orientation of a blank on the base plate, and means for determining the position of any one of a plurality of templates relatively to a blank on the base plate comprising a narrow plate underlying and extending beyond a template positioned thereon, said plate having inscribed thereon an index mark intended to register with a reference mark on a template positioned thereon, and a gage member for determining the position of a template in one direction relatively to a blank on the base plate, said gage member being arranged to abut an edge of a template and having inscribed thereon an index mark intended to register with a reference mark on a template.

3. Apparatus comprising a base plate for supporting a blank, a pin insertable into a bore in the base plate to locate any one of a plurality of blanks on the base plate, an abutment for determining the orientation of a blank on the base plate, and means for determining the position of any one of a plurality of templates relatively to a blank on the base plate comprising a narrow plate underlying and extending beyond a template positioned thereon, said plate having inscribed thereon an index mark intended to register with a reference mark on a template positioned thereon, a gage member for determining the position of a template in one direction relatively to a blank on the base plate, and a block fixed to the base plate and constructed and arranged to mount the gage member for adjustive movement between predetermined gaging positions.

ERNEST L. BUTLER.
OTIS M. HOLMES.

REFERENCES CITED

The following references are of record in the file of this patent:

UNITED STATES PATENTS

| Number | Name | Date |
|---|---|---|
| 1,565,774 | Bartels | Dec. 15, 1925 |